Patented Nov. 20, 1923.

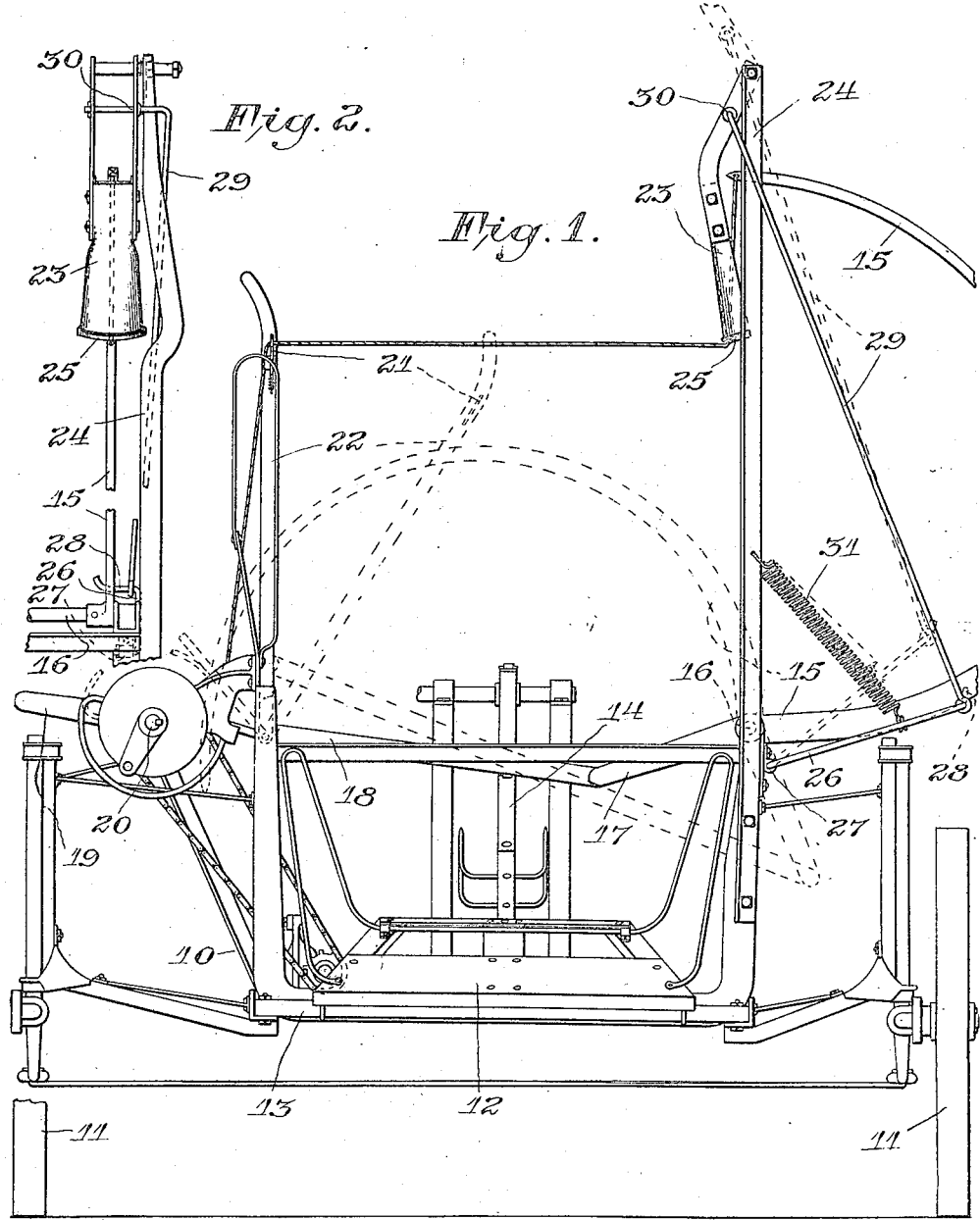

1,474,914

UNITED STATES PATENT OFFICE.

CLEMMA R. RANEY, OF CHICAGO, ILLINOIS, ASSIGNOR TO INTERNATIONAL HARVESTER COMPANY, A CORPORATION OF NEW JERSEY.

SHOCKER TWINE-GUIDING ARM.

Application filed March 1, 1919. Serial No. 280,149.

*To all whom it may concern:*

Be it known that I, CLEMMA R. RANEY, a citizen of the United States, residing at Chicago, in the county of Cook and State of Illinois, have invented certain new and useful Improvements in Shocker Twine-Guiding Arms, of which the following is a full, clear, and exact specification.

This invention relates to twine guiding and controlling means for shockers.

Grain shocking machines of the Raney type of shocker such as illustrated in Patent No. 1,226,369, dated May 15, 1917, deposit the sheaves of grain in a receptacle or cradle and bind the sheaves together prior to depositing the shock. In the Raney shocker referred to and illustrated in the patent above noted, the needle which carries the twine around the sheaves in the cradle, or sheaf receptacle, is normally positioned at one side of the cradle and the knotting mechanism is positioned at the opposite side; therefore, before the sheaves are deposited in the cradle, or when the cradle is empty, the twine extends across the cradle and above the same. The first sheaf deposited in the cradle by the delivery fork engages the twine and carries it downwardly to the bottom of the cradle and the remaining sheaves are deposited on the top of the twine carried down by the first sheaf. If the twine is to be properly positioned on the shock, the proper position being substantially midway between the butts and the heads of the sheaves, it is necessary that the first sheaf deposited in the cradle shall carry the twine down into the cradle in such a position that the twine is located substantially midway between the head and the butt of the initial sheaf.

It has been found by field tests that the twine has not always been properly positioned on the sheaves, but that the first sheaf to be deposited has at times engaged the twine, butt first, and has carried the twine into the cradle in this position.

With the above difficulties in mind, the present invention has for its object to so position the twine above the cradle that the initial sheaf deposited in the cradle will engage the twine substantially midway between the head and butt of the sheaf thereby insuring the proper location of the twine on the completed shock.

In the practical embodiment of my invention illustrated and described in this application, the twine guiding member is carried by a portion of the shocker frame and is disposed in the path of the twine. The member is movably or pivotally mounted and is swung out of operative position as the needle moves to binding position.

In the drawing illustrating my invention,

Figure 1 shows a rear elevation of a shocker of the Raney type having my improved guiding means thereon; and Figure 2 shows a front elevation of the twine guiding means, this view being taken at right angles to Fig. 1.

The construction of the shocker has not been illustrated in detail since the Raney type of shocker has been fully described and illustrated in the patented art as shown in Patent No. 1,226,369 dated May 15, 1917.

As shown in rear elevation in Fig. 1, this shocker comprises a frame 10 supported by wheels 11 and having a hinged cradle 12 pivotally mounted on a shaft 13. The usual sheaf delivery fork 14 is located beneath the binder deck and receives the sheaves from the binder deck and delivers them to the cradle 12. A needle 15 is mounted on the needle shaft 16 actuated through links 17 and 18 connected to a crank 19 carried by the knotter shaft 20. The usual knotting mechanism is also carried by the knotter shaft and cooperates with the needle to tie the sheaves. This construction is substantially the same as that shown in my Patent No. 1,188,392. Intermediate the knotting mechanism and the needle the twine passes through a twine guide 21 carried by a pivoted arm 22, the arm 22 being positively actuated by cam mechanism on the knotter shaft to compress the shock as it is being bound. In the previous constructions the twine passes directly from the free end of the needle to the twine guide 21, the needle being normally disposed in the position shown in full lines in Fig. 1. With the twine so conducted across the top of the cradle, it was found that the initial sheaf deposited in the cradle or receptacle, at times engaged the twine with its butt, thereby carrying the twine to the rear end of the cradle and preventing the proper positioning of the twine on the completed shock.

In order to prevent this engagement of the butt of the initial sheaf with the twine, means has been provided for holding the twine in a lower position so that the butt of the sheaf is permitted to pass over the twine, the twine being engaged by an intermediate portion of the sheaf. This means comprises a twine guiding member 23 pivotally carried on a vertical standard 24 secured to the shocker frame, and provided at its lower end with a concave twine guiding surface 25.

The member 23 is normally positioned in the path of the needle, and means has therefore been provided for raising the twine guiding member 23 to the dotted line position shown in Fig. 1, as the needle is moved across the cradle to the knotting mechanism. To accomplish this purpose a link 26 is pivoted at 27 to the shocker frame, and is provided at its opposite end with a laterally offset portion 28 which is positioned beneath the lower end of the needle. A link 29 is pivoted to the offset portion 28 of the link 26 and at its opposite end is pivotally connected at 30 to the twine guiding member 23. A spring 31 is connected at one one to the vertical standard 24, and at its opposite end to the link 26, and normally holds the offset portion 28 of link 26 in contact with the undersurface of the lower end of the needle 15.

It is believed that the above description will make the construction clear, and in order that the operation of the improved twine guiding member may be understood, a brief statement of its operation is given below.

The positions of the twine, guiding member and needle before the initial sheaf is deposited in the cradle, are shown in full lines in Figure 1. In this position of these elements the twine extends horizontally across the shocker above the cradle. When the fork 14 delivers the initial sheaf to the cradle the horizontal portion of the twine is engaged by the intermediate portion of the sheaf, and is carried to the bottom of the cradle. When sufficient sheaves have been deposited in the cradle to form a shock, the needle 15 is actuated by suitable mechanism and moves from the full line position to the dotted position, and as the needle moves to the dotted line position, the spring 31 pulls upwardly on link 26 and moves the twine guiding member 23 upwardly out of the path of the needle to the dotted line position.

From the above description it will be seen that means has been provided for insuring the proper positioning of the twine on the shock.

While I have in the above specification shown and described but a single embodiment of my invention, it is to be understood that it is capable of modification. Changes therefore in the construction and arrangement of parts may be made without departing from the spirit and scope of the invention as disclosed in the appended claims.

I claim—

1. In a shocker, a frame, a sheaf receptacle carried thereby, a needle mounted on said frame at one side of said receptacle, a knotting mechanism carried by said frame at the opposite side of said receptacle and twine guiding means carried by said shocker frame and normally positioned in the path of movement of said needle intermediate said needle and said knotter mechanism.

2. In a shocker, a frame, a sheaf receptacle carried thereby, a needle pivotally mounted at one side of said receptacle, knotting mechanism carried by said frame at the opposite side of said receptacle, and twine guiding means pivoted to said frame above said needle and movable into the path of movement of said needle, and located intermediate said needle and said knotting mechanism.

3. In a shocker, a frame, a sheaf receptacle carried thereby, a needle mounted on said frame at one side of said receptacle, knotting mechanism carried by said frame at the opposite side of said receptacle, and twine guiding means controlled by said needle and located intermediate said needle and said knotting mechanism.

4. In a shocker, a frame, a sheaf receptacle carried thereby, a needle mounted on said frame at one side of said receptacle, knotting mechanism mounted on said frame at the opposite side of said receptacle, and twine guiding means pivoted to said frame above said needle and movable in a plane coinciding with the plane of said needle.

5. In a shocker, a frame, a sheaf receptacle carried thereby, a needle mounted on said frame at one side of said receptacle and movable across the frame above said receptacle, knotting mechanism located on the frame at the opposite side of said receptacle, twine guiding means pivoted to said frame and normally located between said needle and said knotting mechanism, and means controlled by said needle for moving said twine guiding means out of the path of the needle as the needle moves across the frame to the knotting mechanism.

6. In a shocker, a frame, a sheaf receptacle carried thereby, a needle mounted on said frame at one side of said receptacle, knotting mechanism mounted on said frame at the opposite side of said receptacle, a twine guiding member pivoted to said frame, and resilient means for moving said twine guiding member out of the path of the needle as the needle is moved across the frame to the knotting mechanism.

7. In a shocker, a frame, a sheaf receptacle carried thereby, a needle mounted on said frame at one side of said receptacle, knotting mechanism carried by said frame at the opposite side of said receptacle, and means positioned between said knotting mechanism and said needle for maintaining the twine in a substantially horizontal position above said receptacle prior to the engagement therewith of the initial sheaf deposited in said receptacle.

8. In a shocker, a frame, a receptacle carried thereby, a needle mounted on said frame at one side of said receptacle, knotting mechanism carried by said frame at the opposite side of said receptacle, a vertical standard carried at one side of said frame and extending above the initial position of said needle, twine guiding means pivoted to said standard and extendng across the path of movement of said needle, and means for moving said twine guiding means out of the path of movement of said needle as said needle is moved across the frame to the knotting mechanism.

9. In a shocker, a frame, a sheaf receptacle carried thereby, a needle carried by said frame at one side of said receptacle, knotting mechanism carried by said frame at the opposite side of said receptacle, a twine guiding member pivoted to said frame and normally positioned in the path of movement of said needle, and means for moving said twine guiding member out of the path of movement of said needle.

10. In a shocker, a frame, a needle carried thereby, a twine guiding member pivoted to said frame, a link pivoted to said twine member, and a second link pivoted to said first named link and to said frame and having an offset portion adapted to engage said needle, and resilient means for holding said offset portion of said second named link in engagement with said needle.

11. In a shocker, a frame, a sheaf receptacle carried thereby, a needle, knotting mechanism, and means operatively connected to said needle and interposed between said needle and said knotting mechanism for holding the twine in a substantially horizontal position.

12. In a shocker, a frame, a sheaf receptacle carried thereby, a needle, knotting mechanism, and means interposed between said needle and said knotting mechanism for holding the twine in a substantially horizontal position above said knotting mechanism.

13. In a shocker, a frame, a sheaf receptacle carried thereby, a needle, knotting mechanism, twine guiding means interposed between said needle and said knotting mechanism for holding the twine in a substantially horizontal position above said receptacle, and operative connections between said needle and said twine guiding means for swinging said guiding means to inoperative position as said needle is actuated.

14. In a shocker, a frame, a sheaf receptacle carried thereby, a needle carried by said frame at one side of said receptacle, knotting mechanism carried by said frame on the opposite side of said receptacle, a twine guiding member pivoted to said frame and normally positioned in the path of movement of said needle, and means for moving said twine guiding member out of the path of movement of said needle, said means held inoperative when said needle is in normal position.

15. In a shocker, a frame, a sheaf receptacle carried thereby, a needle, a knotting mechanism, and means interposed between said needle and said knotting mechanism for deflecting the twine downwardly from said needle in a substantially horizontal position.

16. In a shocker, a frame, a sheaf receptacle carried thereby, a needle on said frame at one side of said receptacle, knotting mechanism carried by said frame on the opposite side of said receptacle, and pivotally mounted means on said first mentioned side of said receptacle for maintaining the twine in substantially horizontal position above said receptacle.

In testimony whereof I affix my signature.

CLEMMA R. RANEY.